Patented Aug. 25, 1953

2,650,237

UNITED STATES PATENT OFFICE 2,650,237

PREPARATION OF HEXURONIC ACIDS AND DERIVATIVES THEREOF

Dean H. Couch, China Lake, Calif., and Elonza A. Cleveland, Milan, Italy, assignors to Corn Products Refining Company, New York, N. Y., a corporation of New Jersey No Drawing. Application December 17, 1949, Serial No. 133,691

22 Claims. (Cl. 260—347.3)

The present invention relates to the production of hexuronic acid derivatives and hexuronic acids, and particularly to the production of glucuronic acid, its salts or its lactone.

Production of an uronic acid from an aldohexose requires oxidizing the primary alcohol group of the sugar without alteration of the aldehyde function. Since the aldehyde function is the group most susceptible to oxidative attack, oxidation of the unmodified sugar never produces any substantial amount of uronic acid.

Oxidation of the primary alcohol group of an aldohexose in the form of a derivative in which the aldehyde function is suitably protected offers a means of preparing hexuronic acid derivatives in a form applicable for subsequent processing to obtain the hexuronic acid or its lactone. However, no oxidant is known which specifically attacks the primary alcohol group of such aldohexose derivatives. Secondary alcohol groups are oxidized simultaneously and this results in lowered yields of the uronic acid derivative and a mixture of reaction products among which the desired uronic acid may be a minority product which may be separated only with difficulty, if at all. Because of these difficulties, only complicated and commercially impractical processes have been available for obtaining pure hexuronic acids synthetically. For example, glucuronic acid has been prepared by a process in which 1,2-isopropylidene glucose was first prepared from glucose and then converted to 1,2-isopropylidene-3,5-benzal glucose. The latter compound was then oxidized with potassium permanganate to form 1,2-isopropylidene-3,5-benzal glucuronic acid (Ber. 66, 1326 (1931)). Beta-D-glucose-1,2,3,4-tetraacetate has been oxidized in a similar manner and the product hydrolyzed to obtain glucuronic acid (J. Chem. Soc. 1939, 1530). The yield of glucuronic acid obtained in both of these instances was low and the processes are too complicated to be practical for commercial production.

Glucuronic acid has been obtained by hydrolyzing such compounds as bornyl glucuronoside. Such glucuronic acid derivatives can be extracted from the urine of animals which have been fed suitable drugs. This method is tedious, expensive, and obviously entirely unsuitable for large scale production.

Commercially feasible methods for preparing glucuronic acid or its lactone or salts or derivatives are desirable since several of these compounds have been found to have therapeutic value. For example, it has been reported (Journal Lancet, 67, 451 (1947)) that glucuronic acid or its salts are of benefit in the treatment of arthritis. Combinations of streptomycin and glucuronolactone have been found useful in sterilizing the gut prior to surgery. (Bulletin U. S. Medical Department 9, 265 (1949); also paper presented by Pulaski, Connell and Seely at the 98th Annual Session of the A. M. A., June 8, 1949.)

Nitrogen dioxide is known to oxidize the primary alcohol group quite preferentially in sugar derivatives in which the aldehyde function is adequately protected. When methyl glucoside is so oxidized the yield of uronic acid derivative may be as high as 30 percent to 40 percent of theoretical. However, production of hexuronic acids or hexuronic acid derivatives on a commercial scale by a process involving nitrogen dioxide is attended by distinct disadvantages. Nitrogen dioxide represents a relatively expensive and inconvenient oxidant, the use of which is attended by considerable hazard. Mixtures of nitrogen dioxide and organic materials such as carbohydrate materials are subject to explosion if the ratio of oxidant to organic material exceeds certain values. Most nitrogen dioxide-oxidation systems have employed solutions of the reagent in inert solvents, such as halogenated hydrocarbons, and are operated with a large excess of the oxidant. Such systems are not solvents for carbohydrate materials and their use in oxidizing carbohydrate materials involves a heterogeneous system. Efficient contact between reactants, therefore, is difficult to maintain and equipment capacities are necessarily much lower than would be required in a homogeneous reaction system. The large excess of oxidant that must be employed represents disadvantages both from the standpoint of economics and from the fact that the possibility of hazard is greater under these circumstances.

Accordingly, it is an object of this invention to provide an improved method for the production of hexuronic acids. It is a further object to provide an improved method for the production of hexuronic acid derivatives. Still a further object is to provide an improved method of selectively oxidizing the primary alcohol group of aldohexose sugars. Another object is the provision of a simple method of preparing hexuronic acids and derivatives thereof by oxidizing suitable carbohydrate materials in a homogeneous system without the use of excessive amounts of oxidant, thereby utilizing the maximum capacity of equipment, providing economic use of oxidant, and avoiding oxidation systems wherein explosive reactions may occur. Other objects will appear hereinafter.

We have found that when certain glycosides are subjected to oxidation with nitric acid having a concentration within a specified range and at a temperature within a specified range and in the presence of certain catalysts, the primary alcohol group is oxidized with a considerable degree of selectivity to produce good yields of the corresponding uronic acid derivative. From such uronic acid derivatives the free uronic acid or its lactone can be prepared by suitable procedures. This is a surprising result, since the strength of nitric acid as an oxidant together with the fact that aqueous acids hydrolyze compounds of the acetal type to the parent sugar would negative the probability that any substantial yield of an uronic acid derivative could be obtained by oxidizing compounds such as methyl glucoside with nitric acid. Nitric acid is a strong oxidizing agent that frequently has been used to oxidize organic materials, including carbohydrates. When sugars are oxidized, the usual products are oxalic acid or tartaric acid, the carbon chain of the parent sugar having been ruptured by degradative oxidation. A number of patents have been issued that disclose processes in which carbohydrate materials are oxidatively degraded to short chain acids by means of nitric acid. Furthermore, there is sufficient water in nitric acid to lead one to expect that sugar acetals would be hydrolyzed to the parent sugar, in which case the products resulting from treatment of sugar acetals with nitric acid would be the same as those obtained by treating sugars themselves with nitric acid.

The essential difference between nitrogen dioxide-oxidation processes and nitric acid-oxidation processes lies in the fact that substantially anhydrous systems are employed in the former, while substantial amounts of water are present in the latter. It is well known that nitric acid, particularly fuming nitric acid, and aqueous solutions of nitrogen dioxide represent essentially equivalent systems, chemically. However, we have found that a system having sufficient solvent action on carbohydrate materials to allow a homogeneous reaction system without using an inordinant excess of oxidant, while at the same time containing a sufficient concentration of oxidant to bring about the desired oxidation, must contain a concentration of nitric acid approximately within the range of about 65 percent to about 100 percent. While contributing advantageous solvent action to the oxidant system, this amount of water, surprisingly, does not result in deleterious hydrolysis of the carbohydrate material to any substantial extent. Consequently, we have discovered that the relatively less expensive and more convenient commercial grade of nitric acid can be used in place of nitrogen dioxide to oxidize suitable carbohydrate derivatives to the corresponding uronic acid derivatives under conditions hereinafter set forth.

In general the present invention comprises oxidizing a glycoside characterized hereinafter in the presence of nitrous acid or a metal salt thereof as catalyst, with nitric acid at a temperature between 20° C. and 100° C., the concentration of nitric acid used being within the range of about 65 percent to about 100 percent.

In carrying out the present invention, the glycoside, such as methyl glucoside, together with catalytic amounts of nitrous acid or a metal salt of nitrous acid, is dissolved in sufficient concentrated nitric acid to provide 1.33 moles of nitric acid per mole of the glycoside. This amount of nitric acid is the preferred amount and represents the stoichiometric requirement to convert the glycoside to the uronic acid derivative, assuming that all of the nitric acid is converted to nitric oxide. The reaction mixture is then held at a temperature ranging from 20° C. to 100° C., preferably between 30° C. and 45° C., until oxidation is substantially complete. When carried out within the preferred temperature range a period of 8 to 20 hours is required. The reaction mixture should be agitated throughout the reaction. At the end of the oxidation period the reaction mixture contains 35 percent to 40 percent of the theoretical yield of the uronic acid derivative.

After oxidation has occurred, a number of procedures may be used to refine the oxidation mixture and to recover the uronic acid therefrom. Excess oxidant can be removed by heating for a short time at a higher temperature, with or without the addition of compounds such as formaldehyde or methanol. Colored substances may be removed, for example, by carbon treatment or by extraction with solvents such as butanol, a commercial mixture of amyl alcohols sold under the trade-mark Pentasol, or cyclohexanol. Acidic components of the mixture may be separated from non-acidic components by suitable treatment with ion exchange resins. Dicarboxylic acids, which may be formed by side reactions, may be precipitated and removed, for example, as their calcium or barium salts. The uronic acid derivative may be hydrolyzed by any suitable means such as, for example, by heating in solution with sulfuric acid, phosphoric acid, hydrochloric acid, ethane sulfonic acid or any of a number of commercial cation exchange resins. The hydrolysis may be carried out at atmospheric or higher pressures. The uronic acid or its lactone may be recovered from the liquor by concentrating to such an extent that crystallization occurs, with or without removing the hydrolyzing catalyst. Crystallization may be effected from water, or various solvents such as, for example, acetic acid, isopropyl alcohol, butanol, tertiary butyl alcohol, acetone, dioxane, or diacetone alcohol may be added to facilitate crystallization. A suitable method of recovering the uronic acid is as follows:

The liquor containing the oxidized glycoside, i. e. the uronoside, is mixed with sufficient formalin (40 percent formaldehyde) to provide 1 percent formaldehyde, based on the starting material, and heated at 90° C. to 100° C. for 15 to 30 minutes. The treated liquor is diluted to 5 percent to 10 percent solids and passed over an anion adsorbing resin to separate acidic materials from neutral materials. The uronoside which is adsorbed on the acid adsorbent resin is eluted with an alkaline material such as a solution of sodium hydroxide. The eluate is contacted with a cation exchanger to remove cations. The demineralized solution is then hydrolyzed with an acid such as sulfuric. The hydrolyzate is extracted with butanol, the raffinate is concentrated at low temperature to about 75 percent solids, exclusive of sulfuric acid, the concentrate is diluted with acetic acid and the uronic acid or its lactone is allowed to crystallize.

In carrying out the present invention, there may be used any glycoside in which the primary alcohol group is free. Examples of glycosides that are particularly suitable include both the alpha and beta forms of glucosides such as methyl glucoside, ethyl glucoside, propyl glucoside and isopropyl glucoside. Di- and poly-saccharides such as trehalose and starch which may be considered as glycosides may also be used. Other glycosides such as methyl, ethyl, propyl or isopropyl galactosides and the corresponding mannosides are also suitable. Mixtures of glycosides may also be used. Readily available glycosides such as those above mentioned form homogeneous systems in concentrated nitric acid in the amounts specified for this invention.

The reaction is initiated by dissolving the material to be oxidized, together with the catalyst, in the proper amount of commercial, concentrated nitric acid. The reactants may be mixed in any order. When the reactants are mixed at room temperature in the preferred proportions, a period of 1 to 2 hours may be required to obtain a homogeneous mixture. During this period the temperature falls slightly, due to a negative heat of solution. It is therefore desirable to effect solution of the reactants at a somewhat higher temperature. However, the oxidation of carbohydrate material with nitric acid is a strongly exothermic reaction. If the reactants are mixed at room temperature and then agitated continuously, no temperature change may be noted for a period of 1 to 2 hours after solution has been effected. Then the temperature will begin to rise slowly, but with increasing rapidity, and if allowed to reach about 55° C. will proceed to the boiling point or above with great rapidity, and with copious evolution of oxides of nitrogen. Reactions that are allowed to proceed in this manner produce poor yields of uronic acid derivative and reaction mixtures from which it is difficult to separate the uronic acid that is formed.

We have found that it is advantageous to effect solution of the reactants at a temperature of 45° C. to 50° C. and then to decrease the temperature to 35° C. to 40° C. If operated in this manner, reaction control is facilitated. Reaction mixtures that are not allowed to reach a temperature greater than 45° C. after dissolution is complete are not difficult to control within the temperature range preferred for oxidation. However, if the reactants are dissolved at about 50° C. and the solution is allowed to remain at such temperature, a strong tendency will soon be noted for the temperature to increase, and it may be impossible to arrest this increase, at least with large batches, until the mass has reached about 100° C. Under these conditions, the yield of uronic acid derivative will be lower and the product more difficult to recover, as already stated. Reaction mixtures that are held within the range of 30° C. to 45° C. during the first few hours of reaction, so that a substantial portion of the oxidant is used up within this range, can be allowed to increase to 50° C. to 55° C. without danger of loss of reaction control. In order to obtain the maximum yield of recoverable product, it is best not to allow the temperature to exceed about 60° C. until the major portion of the oxidant has been consumed and the maximum amount of uronic acid derivative has been produced. The temperature then may be increased to 95° C. to 100° C. to effect consumption and removal of residual nitrogen oxides.

The reaction may be carried out at lower temperatures but a longer reaction time is required. The time depends upon the temperature at which reaction is effected. At 20° C., at least 24 hours is required, whereas at 40° C. to 45° C. the maximum yield of uronic acid derivative is attained in 8 to 12 hours. In all cases, there is an induction period after the reactants have been mixed before any substantial amount of uronic acid derivative is produced. This induction period is longer the lower the temperature at which the reactant mixture is held. At 50° C. to 55° C., the induction period is quite short but under these conditions, once reaction starts it is difficult to control.

At least one mole of nitric acid should be used for each mole of glycoside. Larger amounts of nitric acid may be used, such as 2 to 3 moles of oxidant per mole of glycoside, but this of of little advantage since the yield of uronic acid derivative is not increased substantially, the oxidant is used less efficiently, the reaction is more difficult to control, and the product contains more nitrogenous impurities which must be removed.

The concentration of nitric acid may vary from about 65 percent to about 100 percent but concentrations within the range of 70 percent to 75 percent are preferred. When the concentration of nitric acid is above 75 percent, the oxidation is complicated by side reactions and the product is more difficult to isolate.

Mixtures of nitric acid and carbohydrate materials react very slowly at ordinary temperatures unless a catalyst is present. Nitrous acid or any salt of nitrous acid which produces nitrous acid under the conditions of the reaction or the condensed by-product gases of the oxidation reaction serve as effective catalysts in this reaction. These by-product gases are mixtures of oxides of nitrogen which produce nitrous acid in aqueous solution. When sodium nitrite is used, 0.1 percent, based on carbohydrate material, is sufficient, 0.5 percent is preferred, and amounts greater than 2 percent cause little additional improvement.

The following examples which are intended as informative and typical only and not in a limiting sense will further illustrate the invention. Reported yields of uronic acid are based on analysis by the naphthoresorcinol test.

EXAMPLE I

*Oxidation of methyl glucoside*

Samples of methyl glucoside (9.7 g., 0.05 mole) in large test tubes (38 x 200 mm.), equipped with mechanical stirrers, were treated with various amounts and concentrations of oxidant and heated in a bath at temperature levels between 20° C. and 80° C. At predetermined intervals the tubes were removed, the total reaction mixtures were diluted to fixed volumes and the resulting solutions were analyzed for uronic acid. Reaction conditions and yields of uronic acid are shown in Table I.

EXAMPLE II

*Oxidation of methyl glucoside*

A 500 ml. flask equipped with a mechanical stirrer and containing 194 g. (1 mole) of methyl glucoside and 2.0 g. of $NaNO_2$ was placed in a water bath maintained at 30° C., 84 ml. (1.3 moles) of 70 percent nitric acid was added in one portion and agitation was started. At the end of 24 hours, analysis of the reaction mixture indicated a yield of uronic acid amounting to 33.2 percent of theory. The material weight loss during the oxidation due to volatilization was determined as 7.0 percent.

The reaction mixture was diluted with 100 ml. of methanol and, after methyl nitrite-evolution had ceased, 2 liters of water was added. The resulting solution was passed over a column of Duolite A-3 resin to adsorb the acids. The column was washed and then eluted with 0.5 N NaOH, the eluate being passed over a column of Duolite C-3 resin to remove cations. The effluent from the cation exchange resin was concentrated under reduced pressure (below 40° C.) to 15 percent solids, adjusted to 0.7 N with respect to sulfuric acid and heated under reflux for 16 hours in an oil bath maintained at 120° C. The hydrolysate was extracted with normal butyl alcohol and the aqueous layer was concentrated under reduced pressure (below 35° C.) to a solids content of about 75 percent. The remaining water was replaced by distillation with acetic acid. Crystalline glucuronolactone, representing an overall yield of 4.7 percent, based on methyl glucoside, separated from the acetic acid solution on standing. The crystalline material was identified as glucuronolactone by conversion to the semi-carbazone and comparison with an authentic sample.

EXAMPLE III

Oxidation of methyl glucoside

A 3 liter flask, equipped with mechanical stirrer and containing 970.0 g. (5 moles) of methyl glucoside and 10 g. of sodium nitrite, was placed in a water bath maintained at 30° C. After adding 420 ml. (6.5 moles) of concentrated (70%) nitric acid in one portion agitation was started; complete solution occurred within 2 hours. After 24 hours of agitation, during which the temperature of the mixture never exceeded 33° C., agitation was stopped and the reaction flask was removed from the bath. Analysis of an aliquot of the resulting syrup indicated a yield amounting to 30.5 percent of theory; the oxidation product contained 3.55 percent nitrogen (d. b.). Nine 15 g. aliquots of the syrup were removed, three of which were diluted with one-half volume of methanol; 1 ml. of formalin (35% formaldehyde) was added to each of three other aliquots. The 9 aliquots were heated at 90° C. for various periods and then analyzed for nitrogen. Results were as follows:

TABLE I

Yield of uronic acid from nitric acid oxidation of methyl glucoside

| Oxidizing Agent | | Adjunct | Oxidation Time (Hrs.) | | | | | |
|---|---|---|---|---|---|---|---|---|
| Acid Concentration (Percent) | Moles Oxidant per Mole of Glucoside | | 2 | 4 | 7 | 12 | 24 | 48 |
| | | | Yield of Uronic Acid (Percent of Theory) | | | | | |
| *(Reactions at 20° C.)* | | | | | | | | |
| 70 | 1.3 | None | 3 | 3 | 3 | -- | 4 | -- |
| 70 | 1.3 | 1 vol. Percent NO₂ | 4 | 5 | 4 | -- | 10 | -- |
| 70 | 1.3 | 0.1 g. NaNO₂ | 3 | 5 | 5 | -- | 17 | -- |
| 70 | 1.3 | 0.5 g. NaNO₂ | 6 | 9 | 11 | -- | 25 | -- |
| 88.4 | 1.3 | 0.1 g. NaNO₂ | 6 | 7 | 7 | -- | 29 | -- |
| 70 | 2.0 | None | 3 | 3 | 3 | -- | 4 | -- |
| 70 | 2.0 | 1 vol. Percent NO₂ | 6 | 2 | 3 | -- | 18 | -- |
| 70 | 2.0 | 0.1 g. NaNO₂ | 6 | 2 | 3 | -- | 31 | -- |
| 88.4 | 2.0 | None | 4 | 4 | 6 | -- | 34 | -- |
| 88.4 | 2.0 | 0.1 g. NaNO₂ | 6 | 10 | 13 | -- | 38 | -- |
| 70 | 3.0 | 1 vol. Percent NO₂ | 5 | 11 | 20 | -- | 43 | -- |
| 70 | 3.0 | 0.1 g. NaNO₂ | 7 | 11 | 13 | -- | 43 | -- |
| 88.4 | 3.0 | None | 9 | 10 | 20 | -- | 33 | -- |
| 70 | 4.0 | do | 5 | 5 | 5 | -- | 38 | -- |
| *(Reactions at 30° C.)* | | | | | | | | |
| 70 | 1.3 | None | 3 | -- | -- | -- | 4 | -- |
| 70 | 1.3 | 0.1 g. NaNO₂ | 12 | -- | -- | -- | 36 | -- |
| 88.4 | 1.3 | None | 6 | -- | -- | -- | 32 | -- |
| 70 | 1.0 | 0.1 g. NaNO₂ | 9 | -- | -- | 17 | 26 | 34 |
| *(Reactions at 40° C.)* | | | | | | | | |
| 70 | 1.3 | 0.1 g. NaNO₂ | 10 | -- | 26 | 35 | 35 | -- |
| *(Reactions at 50° C.)* | | | | | | | | |
| 70 | 1.0 | 0.1 g. NaNO₂ | 15 | -- | 26 | -- | 33 | -- |
| *(Reactions at 60° C.)* | | | | | | | | |
| 70 | 1.3 | 0.1 g. NaNO₂ | 28 | -- | 30 | 33 | 30 | -- |
| *(Reactions at 80° C.)* | | | | | | | | |
| 70 | 1.3 | 0.1 g. NaNO₂ | 25 | -- | -- | 23 | 20 | -- |

| | Nitrogen Content (percent d. b.) | | |
|---|---|---|---|
| | After 0.5 Hr. at 90° C. | After 1.0 Hr. at 90° C. | After 2.0 Hrs. at 90° C. |
| Untreated aliquots | 0.77 | 0.35 | 0.19 |
| Methanol-treated aliquots | 1.78 | 0.96 | 0.21 |
| Formalin-treated aliquots | 0.28 | 0.32 | 0.22 |

Analysis for uronic acid after the samples had been heated showed no loss resulting from any of the treatments. This example illustrates the method of nitrogen removal.

EXAMPLE IV

Oxidation of trehalose

A sample of trehalose (0.005 mole) in a 6 inch test tube equipped with stirrer and vented stopper was treated with 0.02 mole of 70 percent nitric acid containing 0.015 mole of sodium nitrite per mole of nitric acid. After oxidation at 30° C. for 12 hours, with constant agitation, the yield of uronic acid represented 27 percent of theory.

EXAMPLE V

Oxidation of methyl-alpha-D-glucoside

A solution was prepared consisting of 1940 g. of methyl-alpha-D-glucoside, 20 g. of sodium nitrite and 840 ml. of concentrated nitric acid (70%). The mixture was stirred continuously for 13 hours while the temperature was maintained at 40° C. to 45° C. The temperature then was increased to 95° C. for one-half hour to remove excess oxidant, after which the mixture was cooled. Analysis of the reaction product showed that 40 percent of the methyl glucoside had been converted to methyl glucuronoside. The syrupy oxidation product was heated to 50° C. and neutralized by careful addition of 1.0 N sodium hydroxide solution to a constant pH of 9.5. The neutralized solution was diluted to about 8 percent solids and demineralized by contacting with a commercial cation exchanger. The effluent from the cation exchanger was passed over a column of a commercial anion exchanger to separate acidic materials from non-acidic materials. The methyl glucuronoside which had been adsorbed on the anion exchanger was eluted with 0.5 N sodium hydroxide solution and the eluate was demineralized by contacting with a commercial cation exchanger. The demineralized solution was concentrated to 15 percent solids and hydrolyzed by refluxing in 0.7 N sulfuric acid for 16 hours. The hydrolyzate was extracted with butanol and the raffinate was concentrated at low temperature to about 75 percent solids, exclusive of sulfuric acid. The concentrate was diluted with glacial acetic acid. On standing, the amount of glucuronolactone that crystallized represented a yield of 10 percent, based on the original methyl glucoside.

EXAMPLE VI

Oxidation of methyl glucoside

Exhaust gases from the oxidation of methyl glucoside with nitric acid were collected in a cold trap and then mixed with concentrated nitric acid to serve as catalyst in place of sodium nitrite. The resulting mixture was used for the oxidation of methyl glucoside at 40° C. in the same manner described in Example V except that no sodium nitrite was added. Methyl glucoside was converted to methyl glucuronoside in a yield of 33 percent of theory during a 12 hour oxidation period.

EXAMPLE VII

Oxidation of ethyl glucoside

Ethyl glucoside and concentrated nitric acid (70%) were mixed in the ratio of 1 mole of the glucoside to 2 moles of oxidant and 1 percent of sodium nitrite, based on the weight of the glucoside, was added. The mixture was placed in a bath at 30° C. and stirred continuously. At the end of 24 hours, 32 percent of the ethyl glucoside had been converted to ethyl glucuronoside.

EXAMPLE VIII

Oxidation of starch

Samples of corn starch were mixed with 1.0 percent of their weight of sodium nitrite and then concentrated nitric acid was added in amounts equivalent to 1.33, 2.0, 3.0 and 4.0 moles of oxidant per mole of starch. The mixtures were stirred constantly while maintained at 40° C. At the end of 24 hours, the yields of uronic acid derivative amounted to 20, 21, 27 and 26 percent, respectively, of theory. The oxidized starch product does not produce the maximum response to the naphthoresorcinol test until after hydrolysis. Consequently, in this case, the products were hydrolyzed before analysis. Also, starch is less soluble in concentrated nitric acid than are compounds such as methyl or ethyl glucoside. Therefore, in oxidizing starch a ratio of 2 to 3 moles of oxidant per mole of starch is preferred.

EXAMPLE IX

Oxidation of cyclohexyl glucoside

Cyclohexyl glucoside was subjected to oxidation with nitric acid in exactly the same manner described in Example VII. At the end of 24 hours, the cyclohexyl glucoside had been converted to cyclohexyl glucuronoside in a yield representing 24 percent of theory.

We claim:

1. The method of preparing derivatives of uronic acids which comprises subjecting a glycoside to oxidation with nitric acid in the presence of a catalyst from the group consisting of nitrous acid, salts of nitrous acid, and nitrogen trioxide gas, at a temperature within the range of 20° C. to 100° C. for a sufficient time to oxidize a substantial proportion of the primary alcohol group of said glycoside; the concentration of said nitric acid being within the range of 65 percent to 100 percent; the ratio of said nitric acid to said glycoside being at least one mole of said acid for each mole of glycoside.

2. The method of preparing uronic acid which comprises subjecting a glycoside to oxidation with nitric acid in the presence of a catalyst from the group consisting of nitrous acid, salts of nitrous acid, and nitrogen trioxide gas, at a temperature within the range of 20° C. to 100° C. for a sufficient time to oxidize a substantial proportion of the primary alcohol group of said glycoside, hydrolyzing the resultant uronic acid derivative and removing uronic acid from the reaction mixture; the concentration of said nitric acid being within the range of 65 percent to 100 percent; the ratio of said nitric acid to said glycoside being at least one mole of said acid for each mole of glycoside.

3. The method of preparing uronic acid which comprises subjecting a glycoside to oxidation with nitric acid in the presence of a catalyst from the group consisting of nitrous acid, salts of nitrous acid and nitrogen trioxide gas, and a temperature within the range of 30° C. to 45° C. for 8 to 20 hours, hydrolyzing the resultant uronic acid derivative and removing uronic acid from the reaction mixture; the concentration of said nitric acid being within the range of 65 percent to 75 percent, the ratio of said nitric acid to said glycoside being at least one mole of acid for each mole of glycoside.

4. The method of preparing derivatives of uronic acids which comprises effecting a solution of a glycoside and sodium nitrite in nitric acid at a temperature of 45° C. to 50° C., decreasing the temperature to 35° C. to 45° C. and maintaining the reaction mixture within said temperature range for 8 to 20 hours; the concentration of said nitric acid being within the range of 65 percent to 75 percent, the ratio of said nitric acid to said glycoside being at least one mole of acid for each mole of glycoside.

5. The method of preparing uronic acid which comprises effecting a solution of a glycoside and sodium nitrite in nitric acid at a temperature of 45° C. to 50° C., decreasing the temperature to 35° C. to 45° C. and maintaining the reaction mixture within said temperature range for 8 to 20 hours, hydrolyzing the resultant uronic acid derivative and removing uronic acid from the reaction mixture; the concentration of said nitric acid being within the range of 65 percent to 75 percent, the ratio of said nitric acid to said glycoside being at least one mole of acid for each mole of glycoside.

6. The process according to claim 5 wherein said glycoside is methyl glucoside.

7. The process according to claim 5 wherein said glycoside is ethyl glucoside.

8. The process according to claim 5 wherein said glycoside is cyclohexyl glucoside.

9. The process according to claim 5 wherein said glycoside is starch.

10. The process according to claim 5 wherein said glycoside is trehalose.

11. The process according to claim 2 wherein by-product gases from the oxidation reaction are used in subsequent oxidations as catalyst.

12. The process according to claim 2 wherein said uronic acid derivative is removed from the oxidation mixture by adsorbing said derivative on an acid adsorbent resin and thereafter separating said derivative from said resin.

13. The process according to claim 1 wherein the catalyst is nitrous acid.

14. The process according to claim 2 wherein the catalyst is nitrous acid.

15. The process according to claim 4 wherein the catalyst is sodium nitrite and is present in amount ranging from 0.1 percent to 0.5 percent, based on the weight of the glycoside.

16. The method of preparing uronic acid which comprises subjecting a glucoside to oxidation with nitric acid in the presence of a catalyst from the group consisting of nitrous acid, salts of nitrous acid and nitrogen trioxide gas, at a temperature within the range of 30° C. to 45° C. for 8 to 20 hours, hydrolyzing the resultant uronic acid derivative and removing uronic acid from the reaction mixture; the concentration of said nitric acid being within the range of 65 percent to 75 percent; the ratio of said nitric acid to said glucoside being at least one mole of acid for each mole of glucoside.

17. The method of preparing derivatives of uronic acids which comprises effecting a solution of a glucoside and sodium nitrite in nitric acid at a temperature of 45° C. to 50° C., decreasing the temperature to 35° C. to 45° C. and maintaining the reaction mixture within said temperature range for 8 to 20 hours; the concentration of said nitric acid being within the range of 65 percent to 75 percent; the ratio of said nitric acid to said glucoside being at least one mole of acid for each mole of glucoside.

18. The method of preparing uronic acid which comprises effecting a solution of a glucoside and sodium nitrite in nitric acid at a temperature of 45° C. to 50° C., decreasing the temperature to 35° C. to 45° C. and maintaining the reaction mixture within said temperature range for 8 to 20 hours, hydrolyzing the resultant uronic acid derivative and removing uronic acid from the reaction mixture; the concentration of said nitric acid being within the range of 65 percent to 75 percent, the ratio of said nitric acid to said glucoside being at least one mole of acid for each mole of glucoside.

19. The method of preparing derivatives of uronic acids which comprises effecting a solution of a glycoside and sodium nitrite in nitric acid at a temperature of 45° C. to 50° C., decreasing the temperature to 35° C. to 45° C. and maintaining the reaction mixture within said temperature range for 8 to 20 hours; the concentration of said nitric acid being within the range of 65 percent to 75 percent; the ratio of said nitric acid to said glycoside being at least one mole of acid for each mole of glycoside.

20. The method of preparing uronic acid which comprises effecting a solution of a glycoside and sodium nitrite in nitric acid at a temperature of 45° C. to 50° C., decreasing the temperature to 35° C. to 45° C. and maintaining the reaction mixture within said temperature range for 8 to 20 hours, hydrolyzing the resultant uronic acid derivative and removing uronic acid from the reaction mixture; the concentration of said nitric acid being within the range of 65 percent to 75 percent, the ratio of said nitric acid to said glycoside being at least one mole of acid for each mole of glycoside.

21. The method of preparing uronic acid which comprises subjecting a glycoside to oxidation with nitric acid in the presence of a catalyst from the group consisting of nitrous acid, salts of nitrous acid and nitrogen trioxide gas, and a temperature within the range of 30° C. to 45° C. for 8 to 20 hours, heating the reaction mixture containing the resultant uronic acid derivative to about 90° C. to about 100° C. to remove excess oxidant, hydrolyzing the uronic acid derivative and removing uronic acid from the reaction mixture; the concentration of said nitric acid being within the range of 65 percent to 75 percent, the ratio of said nitric acid to said glycoside being at least one mole of acid for each mole of glycoside.

22. The method of preparing uronic acid which comprises subjecting a glycoside to oxidation with nitric acid in the presence of a catalyst from the group consisting of nitrous acid, salts of nitrous acid and nitrogen trioxide gas, and a temperature within the range of 30° C. to 45° C. for 8 to 20 hours, adding to the reaction mixture containing the resultant uronic acid derivative about 0.5 to 1.0 percent of formaldehyde, based on the weight of the glycoside and heating the mixture to about 90° C. to about 100° C. to remove excess oxidant, hydrolyzing the uronic acid derivative and removing uronic acid from the reaction mixture; the concentration of said nitric acid being within the range of 65 percent to 75 percent, the ratio of said nitric acid to said glycoside being at least one mole of acid for each mole of glycoside.

DEAN H. COUCH.
ELONZA A. CLEVELAND.

References Cited in the file of this patent

Pigman, Chemistry of Carbohydrates, pp. 332–334, Academic Press, Inc., N. Y., 1948.